United States Patent [19]

Angus et al.

[11] Patent Number: 4,685,864
[45] Date of Patent: Aug. 11, 1987

[54] HOLLOW AEROFOIL BLADE

[75] Inventors: James P. Angus, Penrith; Derick A. Perry, Derby, both of England

[73] Assignee: Rolls-Royce plc, London, England

[21] Appl. No.: 790,200

[22] Filed: Oct. 22, 1985

[30] Foreign Application Priority Data

Oct. 30, 1984 [GB] United Kingdom ............... 8427405

[51] Int. Cl.$^4$ ............................................. F01D 5/12
[52] U.S. Cl. ................................ 416/229 R; 416/230; 416/233; 416/241 A
[58] Field of Search .......... 416/224, 225, 226, 229 R, 416/229 A, 230, 232, 233, 234, 240, 241 R, 241 A

[56] References Cited

U.S. PATENT DOCUMENTS

| | | | |
|---|---|---|---|
| 2,714,245 | 8/1955 | Goetzel | 416/241 R |
| 3,105,557 | 10/1963 | Wigal | 416/226 |
| 3,664,764 | 5/1972 | Davies | 416/230 X |
| 4,051,289 | 9/1977 | Adamson | 416/224 X |
| 4,111,606 | 9/1978 | Prewo | 416/230 X |

FOREIGN PATENT DOCUMENTS

| | | | |
|---|---|---|---|
| 561716 | 6/1944 | United Kingdom | 416/233 |
| 1328883 | 7/1973 | United Kingdom | 416/241 A |
| 1380252 | 1/1975 | United Kingdom | 416/241 A |
| 1528356 | 10/1978 | United Kingdom | . |

Primary Examiner—Robert E. Garrett
Assistant Examiner—Joseph M. Pitko
Attorney, Agent, or Firm—Cushman, Darby & Cushman

[57] ABSTRACT

A hollow aerofoil cross-section aircraft propeller blade is provided with a tow of KEVLAR fibres internally thereof. The fibres which are anchored to the blade root and tip portions are arranged to be passive under all normal operating conditions of the blade. However in the event of a structural failure of the blade between its root and tip portions the fibres serve to contain the blade tip together with any portion of the blade attached thereto. The invention is additionally applicable to prop-fan and fan blades for gas turbine engines.

13 Claims, 9 Drawing Figures

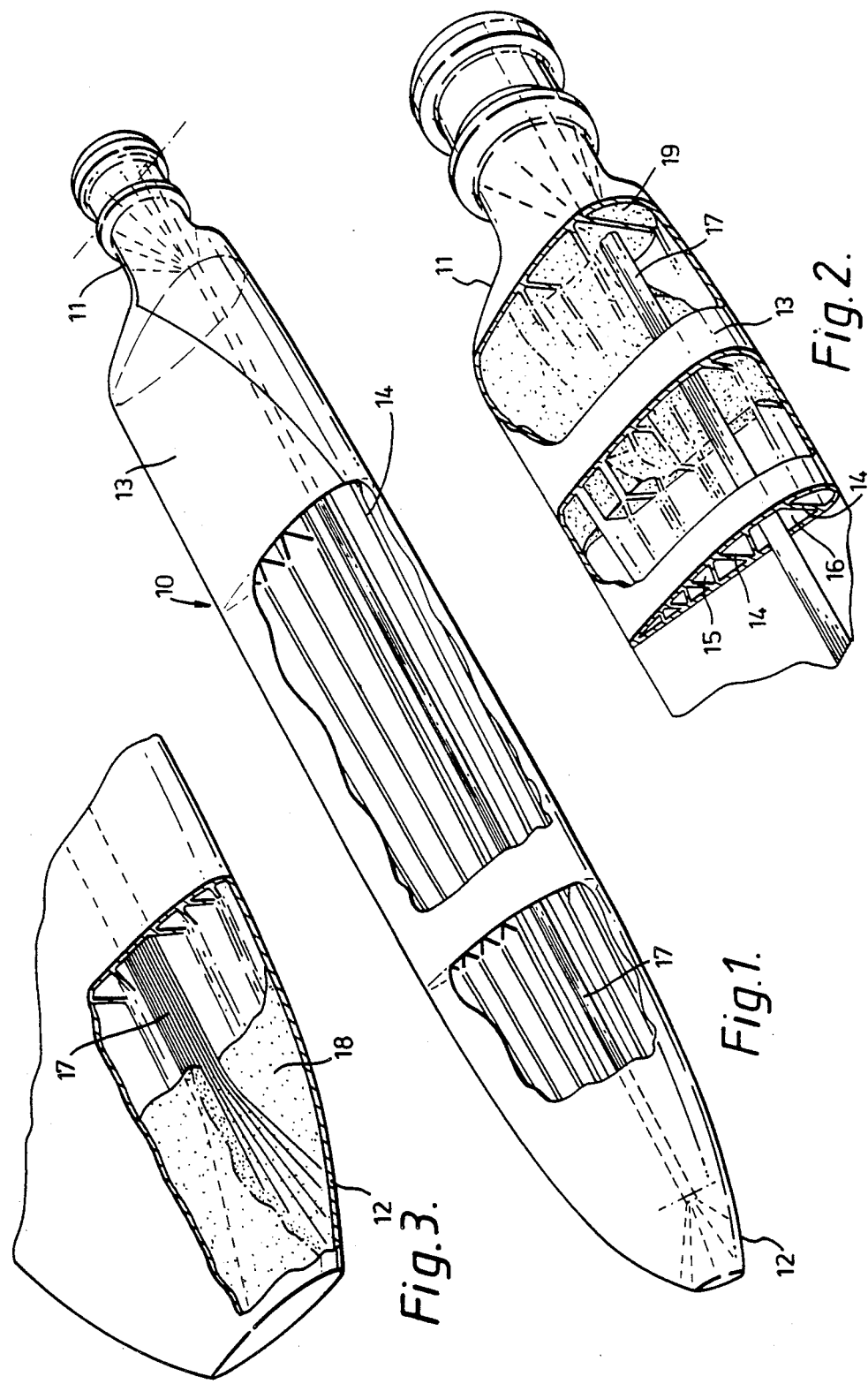

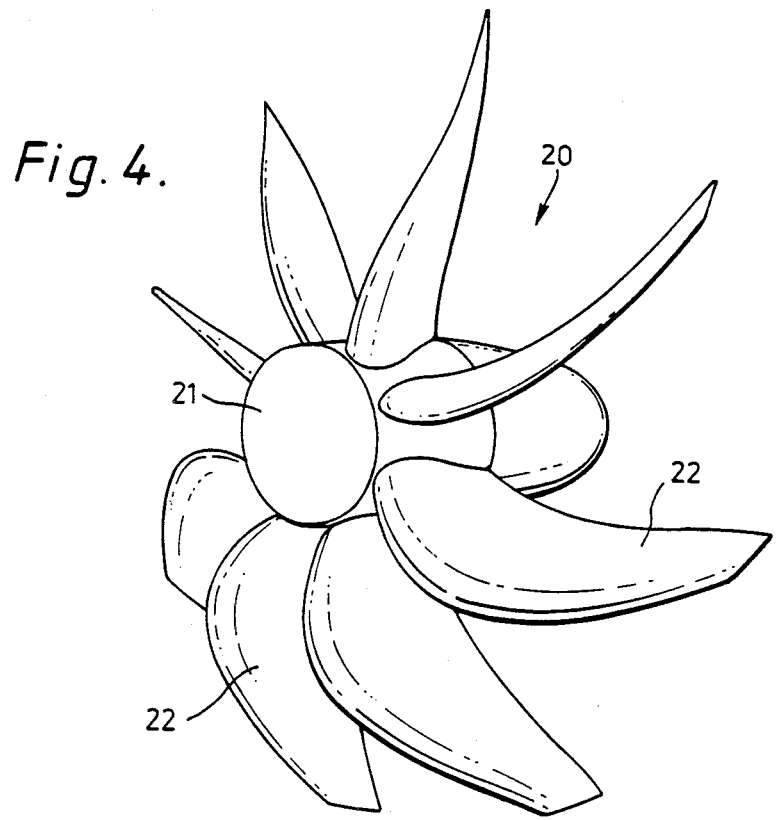
Fig. 4.
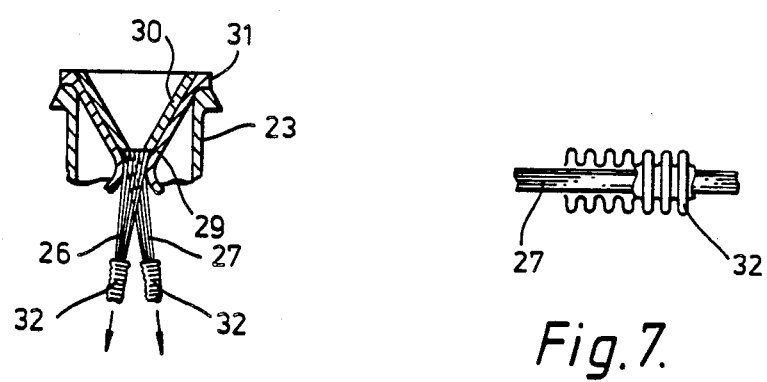
Fig. 6.
Fig. 7.

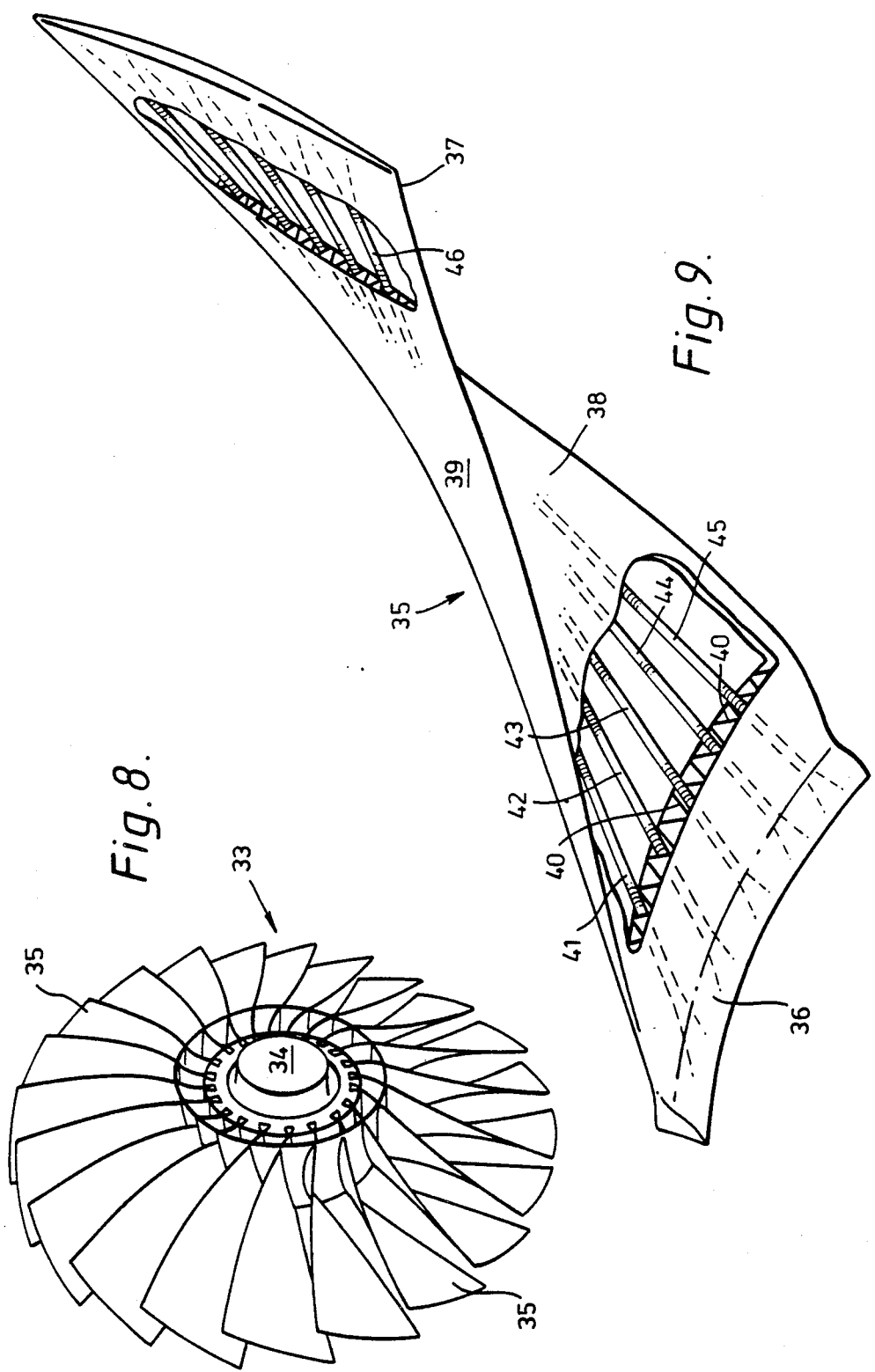

HOLLOW AEROFOIL BLADE

This invention relates to hollow aerofoil blades and in particular to hollow aerofoil blades which are in the form of fan blades, propeller blades and the like.

Aerofoil blades, such as fan blades for ducted fan gas turbine engines and propellers for piston engines and turboprop gas turbine engines, are conventionally solid structures. This brings advantages in terms of blade integrity and cost but is not conducive with weight reduction and consequent improvements in operating efficiency. The quest for weight-reduction has led to interest in hollow aerofoil blades. Particular interest has been expressed in hollow fan blades and the so-called propfan blades for use respectively in the ducted and non-ducted fans of gas turbine engines. While hollow aerofoil blades provide a desirable decrease in weight, they also provide integrity problems. In the event of the failure of a hollow aerofoil blade through, for instance, impact by a bird or other foreign object, there is a great danger of part or all of the blade becoming detached from its mounting structure and causing damage to surrounding structures. If the aerofoil blade is in the form of a fan blade for a ducted fan gas turbine engine, detached blade portions can be contained by the casing which surrounds the fan. However the casing must be sufficiently strong to serve this purpose and is consequently generally heavier than it would need to be if it did not provide containment. Moreover the casing would not protect the engine itself from the effects of a detached blade portion passing into it. The situation with propellors and fan blades for non-ducted gas turbine engines is even nore serious in view of the lack of a surrounding containment structure.

It is an object of the present invention to provide a hollow aerofoil blade which has improved integrity and which therefore is less of a hazard to surrounding structure in the event of a structural failure thereof.

According to the present invention, a hollow aerofoil cross-section rotor blade has a root portion for attachment thereof to a rotatable hub member and a tip portion at the opposite end thereof, said blade having at least one support member mounted internally thereof which extends between and is anchored to said tip and root portions, said at least one support member being arranged to be passive under the normal operating conditions of said blade but be of sufficient strength to contain said tip portion and any of said blade attached thereto in the event of any structural failure of said blade between said tip and root portions.

The invention will now be described, by way of example, with reference to the accompanying drawings in which:

FIG. 1 is a partially broken away view of an aircraft propeller blade in accordance with the present invention.

FIG. 2 is an enlarged partially broken away view of the root portion of the propeller blade shown in FIG. 1.

FIG. 3 is an enlarged partially broken away view of the tip portion of the propeller blade shown in FIG. 1.

FIG. 4 is a view of a propfan for a non-ducted gas turbine engine incorporating a plurality of propfan blades in accordance with the present invention.

FIG. 6 is a sectional side view of a part of an anchoring device within the propfan blade shown in FIG. 5 for support members mounted internally of the propfan blade.

FIG. 7 is a partially broken away view of a sheathing device for the support members mounted internally of the propfan blade shown in FIG. 5.

FIG. 8 is a view of a fan for a gas turbine engine incorporating a plurality of fan blades in accordance with the present invention.

FIG. 9 is a partially broken away view of one of the fan blades of the fan shown in FIG. 8.

Figure 5:
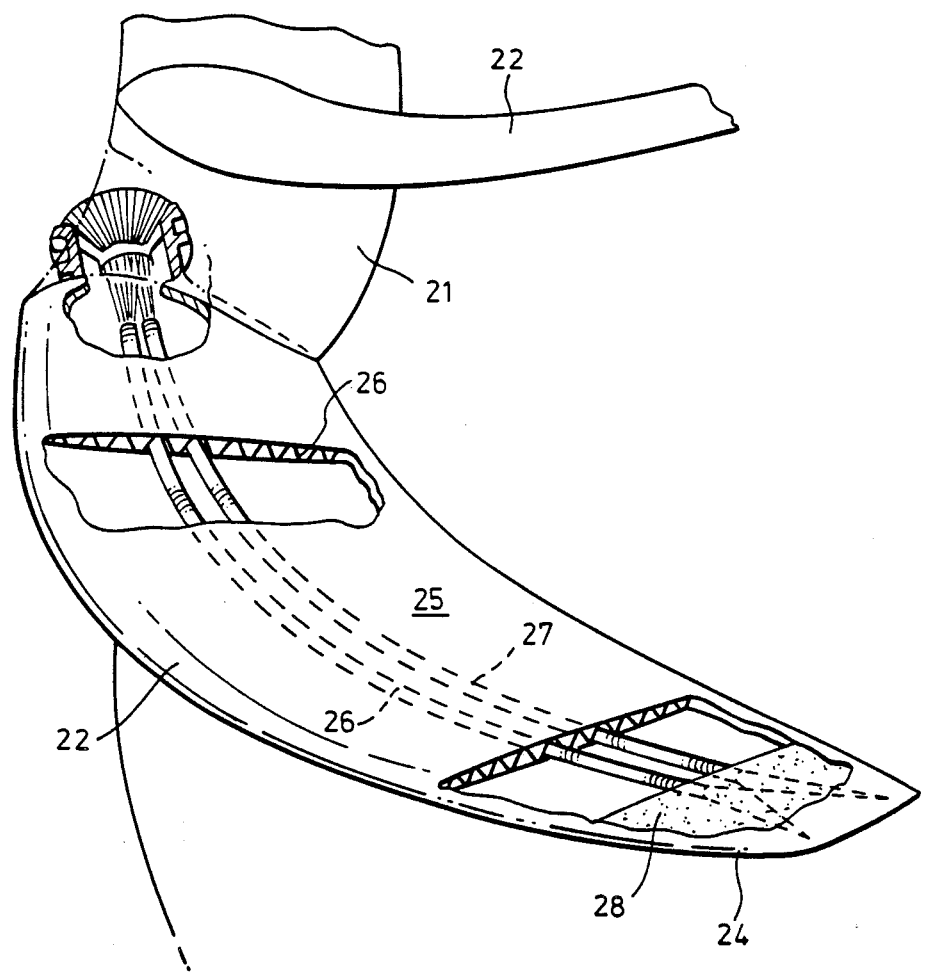
FIG. 5 is an enlarged partially broken away view of the propfan shown in FIG. 4 showing the internal construction of one of the propfan blades.

With reference to FIG. 1, an aircraft propeller blade generally indicated at 10 comprises a root portion 11 for the attachment thereof of a suitable rotatable hub member (not shown) and a tip portion 12 at the opposite end thereof to the root portion 11. The propeller blade 10 is hollow as can be seen in FIG. 1 and comprises an outer metal skin 13 which defines its external aerofoil cross-section shape and a plurality of support webs 14 which interconnect the two faces of the blade 10. The support webs 14, which can be seen more clearly in FIG. 2, define a plurality of triangular cross-section cavities 15 and a single trapezium cross-section cavity 16 extending between the root and tip portions 11 and 12 of the blade 10.

The trapezium cross-section cavity 16 conttains a support member 17 which extends between the root and tip portions 11 and 12. The support member 17 consists of a tow of aramid fibres which are available under the trade name "Kevlar" from Du Pont. The fibres 17 are fanned out in the region of the blade tip portion 12 as can be seen in FIG. 3 and are embedded in a matrix material 18 which may, for instance, be a thermosetting polymer such as an epoxy resin. The matrix material 18 serves to anchor the fibres 17 to the blade tip portion 12. The fibres 17 in the region of the blade root 11 are similarly fanned out and are embedded in a matrix material 19 similar to that in the blade tip 12. Thus the fibres 17 are firmly anchored to the root and tip portions 11 and 12 of the propeller blade 10 but are otherwise free within the interior thereof.

Precautions are taken during the insertion of the fibres 17 within the propeller blade 10 to ensure that under all normal operating conditions of the propeller blade 10, the fibres 17 remain entirely passive i.e. they are not under tension and play no role in strengthening or providing support for the propeller blade 10. The fibres 17 only take on an active role in the event of a structural failure of the propeller blade 10. Thus if any part of the propeller blade 10 between its root and tip portions 11 and 12 is subject to structural failure by, for instance, impact with a foreign object, the tip portion 12, together with any of the propeller blade 10 which is still attached thereto, will be contained by the fibres 17. Thus the propeller blade 10 will not shed the tip portion 12 and any of the blade 10 attached thereto, thereby minimising the damage to surrounding structure.

Obviously in order for the fibres 17 to be capable of containing the tip portion 12 and any of the propeller blade 10 attached thereto, they must be of adequate strength. Consequently the number of "Kevlar" fibres in the tow 17 is chosen such that they will not fail in the event of the largest likely loading being imposed upon them. There need not be a large number of fibres in the tow 17 however in view of the high strength of "Kevlar".

The present invention is not specifically restricted to propeller blades and can be utilised in other types of hollow aerofoil blades such as prop-fan blades and fan blades. In FIG. 4 there is shown a prop-fan 20 for a non-ducted gas turbine engine (not shown). The prop-fan 20 comprises a central hub portion 21 for driving by a gas turbine engine from which radially extend a plurality of similar prop-fan blades 22 in accordance with the present invention.

Each prop-fan blade 22, one of which can be seen more clearly in FIG. 5, is of similar construction to the previously described propeller blade 10 in that it comprises a root portion 23 for the attachment thereof to the hub 21, a tip portion 24 at the opposite end thereof and an aerofoil section which is hollow and defined by a metal skin 25 with interconnecting webs 26. The root and tip portions 23 and 24 are interconnected by two tows 26 and 27 of the previously mentioned, "Kevlar" fibres. The tows 26 and 27 are anchored to the tip portion 24 of the prop-fan blade in the previously described manner by being embedded in a resin matrix material 28. However the tows 26 and 27 are anchored to the root portion 23 by a different arrangement as can be seen more clearly in FIG. 6. The fibres on the end of each tow 26 and 27 are fanned out into a generally conical shape and are trapped between two corresponding conical members 29 and 30. The outer conical member 29 is provided with an annular flange 31 which cooperates with the root portion 23 so as to provide an anchorage for the tows 26 and 27 against movement in a radially outward direction.

In order to provide the fibre tows 26 and 27 with protection against fretting on the internal surfaces of the prop-fan blade 22 and also against the effects of heat if the prop-fan blade 22 is required to operate in a region of high temperature, each of the fibre tows 26 and 27 is sheathed in a thin walled stainless steel tube 32, one of which can be seen more clearly in FIG. 7. The wall fo each tube 32 is of corrugated form as can be seen in FIG. 7 so that it has the appearance of an elongate bellows. This is to provide protection of the fibre tows 26 and 27 from shearing forces in the event of the prop-fan 22 being impacted by a foreign body which may break some fibres in an unprotected tow. Additionally the corrugated form of the tubes 32 ensures that there is not thermal fight between the fibre tows 26 and 27 and their surrounding tubes 32 in the event of temperature variations within the prop-fan blade 22.

As in the case of the previously described propeller blade 10, the tows of fibre 26 and 27 are arranged to be entirely passsive under all normal operating conditions of the prop-fan blade 22. They only come into operation in the event of the prop-fan blade 22 suffering a structural failure whereupon they serve to contain the tip portion 24 and any of the blade 22 which remains attached thereto.

In FIG. 8 there is shown a fan 33 for a gas turbine engine (not shown). Like the previously described prop-fan 20, the fan 33 comprises a central hub portion 34 from which radially extend a plurality of similar fan blades 35. One of the fan blades 35 can be seen more easily in FIG. 9. It comprises a conventional dovetail cross-section root portion 36 for engagement in a correspondingly shape slot in the hub portion 34 and a tip portion 37 at the opposite end thereof. The aerofoil section 38 which interconnects the root and tip portions 36 and 37 is hollow and defined by a metal skin 39 with interconnecting webs 40. The root end tip portions 36 and 37 are interconnected by five tows 41,42,43,44 and 45 of the previously mentioned "Kevlar" fibre, each of which is surrounded by a stainless steel sheath 46 similar to the sheath 32 utilised in the previously described prop-fan blade 22 and is anchored in a resin matrix at the fan root and tip portions 36 and 37.

As in the case of the previously described propeller blade 10 and prop-fan blade 22, the tows 41-45 of "Kevlar" fibre are completely passive during all normal operating conditions of the fan blade 35. They only come into operation as a containment device in the event of a structural failure of the fan blade 35.

The fan blade 35 differs from the propeller blade 10 and prop-fan blade 22 in that in operation, it, and the other fan blades 35 which make up the fan 33, are surrounded by an annular casing (not shown). This being so, the problems associated with a structural failure of a fan blade 35, although still serious, are not as severe as those likely to be experienced by a propeller blade 10 or prop-fan blade 22 which are not surrounded by a casing. Consequently it may be desirable to arrange the fibre tows 41-45 so that in the event of structural failure of the fan blade 35, they initially contain the fan blade tip 37 and any portion of the fan blade 35 attached thereto but then proceed to progressively fail in a controlled manner. This brings the damaged fan blade 35 into progressive engagement with the surounding casing, thereby resulting in rubbing between the fan blade tip 37 and the casing which in turn provides a gradual dissipation of the released energy of the damaged fan blade 33. This provides certain advantages over a fan blade which does not provide such slow release.

These advantages include:

(a) the avoidance of the release fan blade impacting and causing the release of a second fan blade (b) the avoidance of the released fan blade escaping forwardly or rearwardly of the containment area of the surrounding casing.

(c) a weight reduction resulting from the use of smaller amount of "Kevlar" fibre.

(d) allowing engine accessories to be mounted over the plane of the fan blades.

(e) the use of a less massive casing than would be required with a conventional ducted fan gas turbine engine.

Although the present invention has been described with reference to hollow aerofoil cross-section blades which are provide with support members made form "Kevlar" fibre, it will be appreciated that alternative materials, such as wire, could be used if so desired. Moreover means other than the sheathing 32 could be used to protect the fibre tows. The tows could, for instance, be protected from the effects of heat by being surrounded by a suitable low density foam material or alternatively being situated in a flow of centrifugally pumped cooling air.

The metal used to define the aerfoil cross-section forms of the propeller blade 10, prop-fan blade 22 and fan blade 35 preferably titanium since it can be superplastically deformed and diffusion bonded to provide the necessary shape. However the invention is not specifically restricted to hollow aerofoil blades formed from this material since it is envisaged that alternative materials could be used in the manufacture of hollow aerofoil blades.

We claim:

1. A hollow aerofoil cross-section rotor blade having a root portion for attachment thereof to a rotatable hub member and a tip portion at the opposite end thereof, said blade having at least one support member mounted internally thereof which extends between and is anchored to said tip and root portions, said at least one support member having an unanchored portion extending substantially between said anchored root and tip portions and which is nonsupporting relative to said blade under the normal operatiing conditions of said blade, but which is of sufficient strength to contain said tip portion and any of said blade attached thereto in the event of any structural failure of said blade between said tip and root portions.

2. A hollow aerofoil cross-section rotor blade as claimed in claim 1 wherein said at least one support member is protectively sheathed.

3. A hollow aerofoil cross-section rotor blade as claimed in claim 2 wherein said at least one support member is sheathed by a thin walled metallic tube, the wall of which is corrugated.

4. A hollow aerofoil cross-section rotor blade as claimed in claim 1 wherein said at least one support member is anchored to at least one of said blade root and tip portions by the enclosure thereof in a matrix material enclosed in turn within said at least one of said blade root and tip portions.

5. A hollow cross-section rotor blade as claimed in claim 4 wherein said matrix material is an epoxy resin.

6. A hollow aerofoil cross-section rotor blade as claimed in claim 1 wherein said at least one support member is anchored to at least one of said blade root and tip portions by the frictional engagement thereof between adjacent confronting surfaces of anchoring means attached to said at least one of said blade root and tip portions.

7. A hollow aerofoil cross-section rotor blade as claimed in claim 1 wherein said at least one support member is arranged to be of such strength that in the event of any structural failure of said blade between said tip and root portions said tip portion and any of said blade attached said tip portion and any of said blade attached thereto, is intially contained by said support member and subsequently released from said root portion in a controlled manner.

8. A hollow aerofoil cross-section rotor blade as claimed in claim 1 wherein said at least one support member consists of a tow of fibres.

9. A hollow aerofoil cross-section rotor blade as claimed in claim 8 wherein said fibres are formed from an aramid.

10. A hollow aerofoil cross-section rotor blade as claimed in claim 1 wherein said blade is in the form of an aircraft rotor blade.

11. A hollow aerofoil cross-section blade as claimed in claim 10 wherein said blade is at least partially formed from superplastically deformed, diffusion bonded titanium.

12. A hollow aerofoil cross-section rotor blade as claimed in claim 1 wherein said blade is in the form of a prop-fan blade for a gas turbine engine.

13. A hollow aerofoil cross-section rotor blade as claimed in claim 1 wherein said blade is in the form of a fan blade for a ducted fan gas turbine engine.

* * * * *